Figure 1:
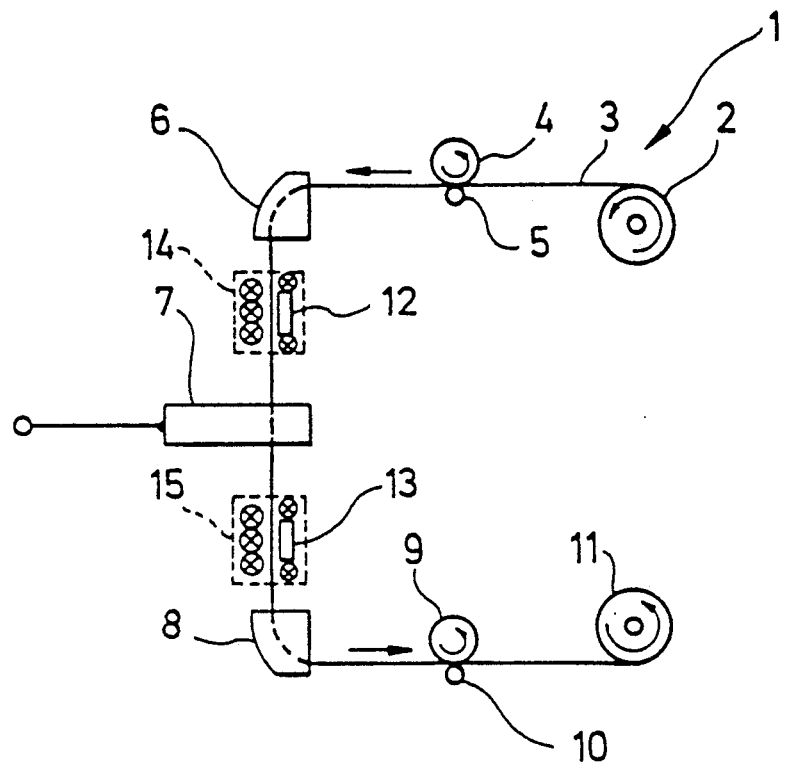

United States Patent [19]

Wehrli

[11] Patent Number: 5,041,708

[45] Date of Patent: Aug. 20, 1991

[54] POWER SUPPLY APPARATUS FOR AN ELECTROEROSION MACHINE

[76] Inventor: Peter Wehrli, 6611, Auressio, Switzerland

[21] Appl. No.: 521,362

[22] Filed: May 10, 1990

[30] Foreign Application Priority Data

May 12, 1989 [DE] Fed. Rep. of Germany ....... 3915614

[51] Int. Cl.⁵ .............................................. B23H 1/02
[52] U.S. Cl. ............................... 219/69.12; 219/69.13
[58] Field of Search ............... 219/69.12, 69.13, 69.15, 219/69.18; 226/195, 196, 197, 198

[56] References Cited

U.S. PATENT DOCUMENTS

| | | | |
|---|---|---|---|
| 4,321,450 | 3/1982 | Inoue | 219/69.17 |
| 4,471,197 | 9/1984 | Inoue | 219/69.17 |
| 4,652,717 | 3/1987 | Briffod et al. | 219/69.12 |

FOREIGN PATENT DOCUMENTS

| | | |
|---|---|---|
| 56-14408 | of 0000 | Japan . |
| 56-16008 | of 0000 | Japan . |
| 60-221220 | 11/1985 | Japan . |
| 61-109617 | 5/1986 | Japan . |
| 61-164727 | 7/1986 | Japan . |

Primary Examiner—Peter S. Wong

[57] ABSTRACT

A power supply apparatus for an electroerosion machine serves to carry an erosion current to a passing-through erosion wire by means of at least one contact part, said erosion wire being pressed against the contact part by means of a contact pressure device. In order to increase the erosion currents which can be carried, the contact pressure device is formed by a magnetic field generating means which applies a magnetic field to the erosion wire.

20 Claims, 1 Drawing Sheet

POWER SUPPLY APPARATUS FOR AN ELECTROEROSION MACHINE

The present invention relates to a power supply apparatus for an electroerosion machine for carrying an erosion current to a passing-through erosion wire by means of at least one contact part, said apparatus including a contact pressure device for pressing the erosion wire against the contact part.

In the case of conventional electroerosion machines an erosion wire runs from a supply roller over a guide pulley through a working gap in the workpiece and is deflected on another guide pulley to a take-up roller for the erosion wire. Between the two guide pulleys there is disposed at least one contact part which forms a sliding contact for carrying the erosion current to the erosion wire. Carrying the erosion current, which has high current-pulses, to the erosion wire by means of the contact part requires a force which presses the erosion wire against the contact part so as to guarantee the contact pressure necessary for carrying current. In a known power supply apparatus for an electroerosion machine this contact pressure is produced in that the contact parts are placed such that said parts deflect the erosion wire, which passes over the contact parts, from the location the wire would have if it were simply guided over the two guide pulleys in a tensed way, without any contact parts. If an increase of the currents fed to the erosion wire is desired in the known power supply apparatus, this requires an increase of the contact pressure and, thus, a more marked deviation of the erosion wire. However, the permitted deviation of the erosion wire is to a certain degree limited by the facts that the erosion wire can be threaded automatically only up to a certain deviation, that the power supply apparatus will require more room, and that there will be problems concerning the guiding accuracy of the erosion wire.

There are already power supply apparatuses known, for instance from U.S. Pat. No. 4,263,116, in which the demand of increased deviation of the erosion wire required for the generation of the necessary contact force is avoided in that the erosion wire is guided between two adjacent contact parts which have the shape of rollers. However, in such embodiment of the contact parts only comparatively small contact surfaces are obtained between the roller-shaped contact part and the erosion wire, which involves a corresponding limitation in the intensity of the current which can be carried.

It is known from JP-A-56-16008 to apply a magnetic field to the erosion wire of an electroerosion machine in order to cause a vibration of the erosion wire, thus removing working residues and gas constituents from the working gap of the workpiece.

It is known from JP-A-56-14408 to provide an electroerosion machine with a magnetic field generating means, which means is disposed above or below the working gap and, generates a magnetic field which is vertical to the direction of the wire electrode. As in the above discussed publication, this magnetic field is then used to cause a vibration of the wire electrodes, which is to serve the removal of air bubbles or particle residues from the working gap.

It is known from JP-A-60-221220 to adjust the guidance of the erosion wire of an electroerosion machine by means of an electric, magnetic or thermal positioning element so as to achieve a slight displacement of the erosion wire.

It is known from JP-A-61-109617 to provide an electroerosion machine with an annular electromagnet which is coaxial to the erosion wire. However, this electromagnet serves to hold the workpiece by means of magnetic force while the workpiece is worked.

It is known from JP-A-61-164727 to form a bearing for the guidance of the erosion wire, said bearing consisting of two guide parts which are mutually attracted by magnetic force, which touch the erosion wire from three sides, thus generating an essentially constant squeezing force for the guidance of the erosion wire, independent of minor differences in the thickness of said wire.

As compared to this prior art, the object of the present invention is to develop an electroerosion machine of the type described in such manner that also higher erosion currents can be carried to the erosion wire.

This object is achieved in accordance with the invention by providing that in a power supply apparatus for an eletroerosion machine for carrying an erosion current to a passing-through erosion wire by means of at least one contact part, including a contact pressure device for pressing the erosion wire against the contact part, said contact pressure device is formed by a magnetic field generating means which applies a magnetic field to the erosion wire.

The invention is based on the knowledge that the generation of the necessary contact pressing power can be achieved particularly advantageously by applying a magnetic, field to the erosion wire in the area of the contact part, so that the erosion wire, together with the magnetic field, causes a Biot-Savart force which presses the erosion wire against the contact part. As this pressure, which is vertical to the magnetic field and to the direction of the current flow, is proportional to the intensity of the erosion current flowing through the erosion wire, a high contact force will always be achieved exactly at the moment when it is required for carrying high-intensity erosion currents.

Preferably, the magnetic field generating means is positioned such that the magnetic field extends vertically to the erosion wire, as only that component of the magnetic field which is vertical to the erosion wire will contribute to the generation of the Biot-Savart force.

A particularly high pressure force which does not involve an undesired deviation of the erosion wire outside the contact part is preferably achieved in that the magnetic field generating means is formed such that the dimension of the magnetic field it generates in the direction of the erosion wire corresponds essentially to the length over which the erosion wire is adjacent to the contact part.

Preferably, a particularly high field intensity in the area of the erosion wire and, thus, a high pressing power on the contact part is achieved in that the magnetic field generating means produces a magnetic field which, in the direction vertical to the contact part, is one or even several times as thick as the erosion wire. Basically, it is desirable that the magnetic field is as completely as possible permeated by the erosion wire, as a part of the magnetic field which is not permeated by the erosion wire cannot contribute to the generation of the Biot-Savart force.

A particularly simple embodiment of the magnetic field generating means is preferably achieved in that said means is formed by a permanent magnet.

Preferably, the permanent magnet has two pole faces which extend in the direction of the erosion wire and are kept at a distance to the latter as well as to the contact part, said distance being relatively small compared to their longitudinal extensions.

Preferably the contact part is provided with an essentially plane contact surface and is disposed such that the erosion wire is not or only so slightly deflected by the contact part that the contact pressing power, which is caused by the slight deviation, is smaller than the contact pressing power which can be produced by the magnetic field generating means. In this embodiment, the contact pressing power is, apart from an initial force which is required even if there is no erosion current, proportional to the erosion current.

Figure 2:
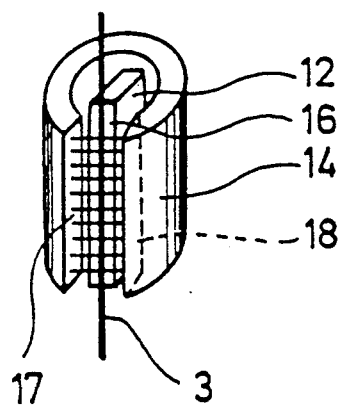

In the following, a preferred embodiment of the power supply apparatus as specified in the present invention will be explained in greater detail with reference to the attached drawing in which:

FIG. 1 is a schematic representation of an electroerosion machine including an embodiment of the power supply apparatus of the invention; and FIG. 2 is a detailed view of the power supply apparatus.

As can be seen in FIG. 1, an electroerosion machine which, as a whole, is designated 1, contains a supply roller 2 of an erosion wire 3 which is guided over first transport roller 4 with counter roller 5 to first deflecting and guide device 6, passes through a working gap in workpiece 7, is again deflected and guided at second deflecting and guide device 8 below workpiece 7, before erosion wire 3 is fed into a take-up roller 11 for erosion wire 3 over second transport roller 9 and second counter roller 10.

Between first deflecting and guide device 6 and workpiece 7 and/or between workpiece 7 and second deflecting and guide device 8 there is disposed first and/or second contact part 12,13. To first and second contact part 12,13 a first potential is applied while a second potential is applied to workpiece 7 so that there will be a flow of erosion current between first contact part 12 and workpiece 7 and/or between second contact part 13 and workpiece 7. In the vicinity of first contact part 12 as well as in the vicinity of second contact part 13 there is disposed a first and/or second magnetic field generating means 14,15 which means are only roughly outlined in FIG. 1 by dot-and-dash lines. The magnetic field generating means 14,15 produce magnetic fields which are indicated in FIG. 1 by their lines of magnetic flux which extend vertically to the direction of erosion wire 3 as well as vertically to the normal line of the contact surface of first and/or second contact part 12,13.

As can be seen in detail in FIG. 2, first contact part 12 has a curved or essentially plane contact surface 16 to which erosion wire 3 is adjacent. Contact part 12 is surrounded by a magnetic field generating means 14, said means being essentially hollow-cylindrical or U-shaped and having a recess which extends in the direction of the axis of the hollow cylinder and is bordered by a magnetic north surface 17 and a magnetic south surface 18.

The length of magnetic field generating means 14 in the direction of erosion wire 3 essentially corresponds to the length of first contact part 12 in this direction. The radial depth of pole surfaces 17,18 is preferably only a few times the thickness of the erosion wire in order to achieve a maximum concentration of the magnetic field in the area in which erosion wire 3 will lie.

The pole surfaces 17,18 extend in the direction of the erosion wire and are kept from it just as far that erosion wire 3 does not touch pole surfaces 17,18 during the erosion operation.

In a modification of the embodiment described above and shown, it is possible to use an electromagnet as a magnetic field generating means. In this case it is contemplated to operate the electromagnet with the erosion current or with a current which is independent of the erosion wire.

I claim:

1. A power supply apparatus for an electroerosion machine having means for transferring an erosion current to a traveling erosion wire comprising:
   (a) electrical current contact means for providing the erosion current to the traveling erosion wire; and
   (b) magnetic field generating means for applying a magnetic force on the traveling erosion wire and pressing it against the electrical current contact means, thereby allowing the erosion current to flow between the electrical current contact means and the traveling wire.

2. A power supply apparatus as claimed in claim 8 characterized in that the magnetic field generating means (14,15) is formed such that the dimension of the magnetic field it produces in the direction of the erosion wire (3) corresponds essentially to the length over which the erosion wire (3) is adjacent to the electrical current contact means (12,13).

3. A power supply apparatus as claimed in claim 1, characterized in that the magnetic field generating means (14,15) is formed such that the dimension of the magnetic field it produces in the direction of the erosion wire (3) corresponds essentially to the length over which the erosion wire (3) is adjacent to the contact part (12,13).

4. A power supply apparatus as claimed in claim 1 characterized in that the magnetic field generating means (14,15) produces the magnetic field in a direction vertical to the electrical current contact means (12,13) with a thickness more than twice the diameter of the erosion wire.

5. A power supply apparatus as claimed in claim 1, characterized in that the magnetic field generating means (14,15) is formed by a permanent magnet.

6. A power supply apparatus as claimed in claim 5, characterized in that the permanent magnet (14,15) has two pole faces (17,18) which extend in the direction of the erosion wire (3) and are kept at a distance to the latter (3) as well as to the contact part (12,13), said distance being relatively small compared to their longitudinal extensions.

7. A power supply apparatus for an electroerosion machine having means for transferring an erosion current to a traveling erosion wire comprising:
   (a) electrical current contact means for providing the erosion current to the traveling erosion wire; and
   (b) magnetic field generating means for applying a magnetic force on the traveling erosion wire and pressing it against the electrical current contact means allowing the erosion current to flow between the electrical current contact means and the traveling wire, the magnetic force being proportional to the intensity of the erosion current, so that an increased magnetic force presses the traveling wire against the electrical current contact means when an increased erosion current flows therebetween.

8. A power supply apparatus as claimed in claim 7, characterized in that the electrical current contact means (12,13) has an essentially plane contact surface (16) and that the electrical current contact means (12,13) is disposed such that the erosion wire (3) is not or only so slightly deflected by the electrical current contact means (12,13) that the contact pressing power, which is caused by the slight deviation, is smaller than the contact pressing power which can be produced by the magnetic field generating means (14,15).

9. A power supply apparatus as claimed in claim 7, characterized in that the magnetic field generating means (14,15) produces a magnetic field which extends vertically to the erosion wire (3).

10. A power supply apparatus as claimed in claim 7 characterized in that the magnetic field generating means (14,15) is formed such that the dimension of the magnetic field it produces in the direction of the erosion wire (3) corresponds essentially to the length over which the erosion wire (3) is adjacent to the electrical current contact means (12,13).

11. A power supply apparatus as claimed in claim 7 characterized in that the magnetic field generating means (14,15) produces the magnetic field in a direction vertical to the electrical current contact means (12,13) with a thickness more than twice the diameter of the erosion wire.

12. A power supply apparatus as claimed in claim 7 characterized in that the magnetic field generating means (14,15) is formed by a permanent magnet.

13. A power supply apparatus as claimed in claim 12, characterized in that the permanent magnet (14,15) has two pole faces (17,18) which extend in the direction of the erosion wire (3) and are kept at a distance to the latter (3) as well as to the electrical current contact means (12,13), said distance being relatively small compared to their longitudinal extensions.

14. A power supply apparatus as claimed in claim 7, characterized in that the contact part (12,13) has an essentially plane contact surface (16) and that the electrical current contact means (12,13) is disposed such that the erosion wire (3) is not or only so slightly deflected by the electric current contact means (12,13) that the contact pressing power, which is caused by the slight deviation, is smaller than the contact pressing power which can be produced by the magnetic field generating means (14,15).

15. A power supply apparatus for an electroerosion machine having means for transferring an erosion current to a traveling erosion wire comprising:
(a) electrical current contact means for providing the erosion current to the traveling erosion wire; and
(b) magnetic field generating means disposed about said electrical current contact means for applying a magnetic force on the traveling erosion wire and pressing it against the electrical current contact means therein allowing the erosion current to flow between the electrical current contact means and the traveling wire, the magnetic force being proportional to the intensity of the erosion current, so that an increased magnetic force presses the traveling wire against the electrical current contact means when an increased erosion current flows therebetween.

16. A power supply apparatus as claimed in claim 15, characterized in that the magnetic field generating means (14,15) produces a magnetic field which extends vertically to the erosion wire (3).

17. A power supply apparatus as claimed in claim 15 characterized in that the magnetic field generating means (14,15) is formed such that the dimension of the magnetic field it produces in the direction of the erosion wire (3) corresponds essentially to the length over which the erosion wire (3) is adjacent to the electrical current contact means (12,13).

18. A power supply apparatus as claimed in claim 15 characterized in that the magnetic field generating means (14,15) produces the magnetic field in a direction vertical to the electrical current contact means (12,13) which has a thickness more than twice the diameter of the erosion wire.

19. A power supply apparatus as claimed in claim 15 characterized in that the magnetic field generating means (14,15) is formed by a permanent magnet.

20. A power supply apparatus as claimed in claim 15, characterized in that the permanent magnet (14,15) has two pole faces (17,18) which extend in the direction of the erosion wire (3) and are kept at a distance to the latter (3) as well as to the electrical current contact means (12,13), said distance being relatively small compared to their longitudinal extensions.

* * * * *